US012614924B2

(12) United States Patent (10) Patent No.: US 12,614,924 B2
Paczkowski et al. (45) Date of Patent: Apr. 28, 2026

(54) SYSTEMS AND METHODS OF POWER HARVESTING AND DISTRIBUTION

(71) Applicant: T-MOBILE INNOVATIONS LLC, Overland Park, KS (US)

(72) Inventors: Lyle Walter Paczkowski, Mission Hills, KS (US); Lyle T. Bertz, Lee's Summit, MO (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 643 days.

(21) Appl. No.: 18/095,361

(22) Filed: Jan. 10, 2023

(65) Prior Publication Data

US 2024/0235256 A1     Jul. 11, 2024

(51) Int. Cl.
*H02J 50/00* (2016.01)
*H02J 50/10* (2016.01)
*H04W 76/10* (2018.01)

(52) U.S. Cl.
CPC ............ *H02J 50/001* (2020.01); *H02J 50/10* (2016.02); *H04W 76/10* (2018.02)

(58) Field of Classification Search
CPC .......... H02J 50/001; H02J 50/10; H02J 50/20; H04W 76/10
See application file for complete search history.

(56) References Cited

U.S. PATENT DOCUMENTS

| | | | |
|---|---|---|---|
| 10,536,038 B1 * | 1/2020 | Boyd ..................... | H04B 1/082 |
| 12,391,094 B2 * | 8/2025 | Ali ..................... | B60H 1/00807 |
| 2011/0115303 A1 * | 5/2011 | Baarman ................. | H02J 50/12 |
| | | | 307/104 |
| 2024/0154457 A1 * | 5/2024 | Paczkowski ......... | H01Q 1/2225 |
| 2024/0190207 A1 * | 6/2024 | Ali ........................ | H02J 50/001 |
| 2025/0008490 A1 * | 1/2025 | Elshafie ................ | H04L 5/0053 |
| 2025/0219447 A1 * | 7/2025 | Wu ..................... | H04W 72/044 |
| 2025/0261170 A1 * | 8/2025 | Elshafie .................. | H02J 50/80 |

* cited by examiner

*Primary Examiner* — Fayyaz Alam
(74) *Attorney, Agent, or Firm* — Shook, Hardy & Bacon L.L.P.

(57) ABSTRACT

Systems, methods, and devices that facilitate battery recharge from harvesting energy from radio frequency (RF) signals described. A UE may harvest energy from signals absorbed by the UE's antenna. The energy may be transferred from the UE to a remote device. Additionally, the power generation and transfer may be monitored and tracked.

15 Claims, 7 Drawing Sheets

RECEIVE A PLURALITY OF SIGNALS BROADCAST AT A PLURALITY OF FREQUENCIES

410

CONVERT A FIRST SIGNAL OF THE PLURALITY OF SIGNALS TO A CURRENT

420

TRANSMIT THE CURRENT TO A SECOND DEVICE

430

400

SYSTEMS AND METHODS OF POWER HARVESTING AND DISTRIBUTION

BACKGROUND

User equipment and devices commonly used in association with user equipment traditionally rely on one or more batteries for power. Recharging these batteries traditionally requires a dedicated charging system that connects the UE or device to a power grid. As such, traditional recharge systems may not be able to provide sufficient flexibility for every situation where recharging may be desired.

BRIEF SUMMARY

A high-level overview of various aspects of the technology described herein is provided as an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

Aspects described herein generally relate to systems, methods, and processes for battery recharging from power harvested from RF signals broadcast to user equipment. For example, a method described herein comprises receiving, by a first device, a plurality signals broadcast at a plurality of frequencies. Each signal of the plurality of signals can be broadcast at a different frequency of the plurality of frequencies. In some aspects, the plurality of frequencies are in the range of 2.1 GHz and 86 GHz. Additionally, in some aspects the first signal is selected by filtering the plurality of signals based on a set of software defined radio rules, the filtered set of signals including the first signal and excluding a second signal. The second signal may be used to facilitate bidirectional communication from a network core (e.g., via a RAN) and the user equipment. The method may quantifying the current transmitted to a second device as a measure of power and communicate that to a database for storage. The method may further include transmitting the current to the second device includes the first device inducing a magnetic field or mechanically coupling the first device and the second device.

Some aspects herein are directed to a radio frequency (RF) powered system for wireless communication. In an aspect, the system includes an user device including at least one antenna communicatively coupled to a rectifier circuit and computer readable memory storing instructions that when executed by the user device cause the user device to perform operations. The operations include receiving, a plurality signals broadcast at a plurality of frequencies, each signal of the plurality of signals broadcast at a different frequency of the plurality of frequencies, converting a first signal of the plurality of signals to a current, and transmitting the current to a remote device.

Some aspects herein are directed to non-transitory storage media storing computer instructions that when executed by at least one processor cause the at least one processor to perform operations. In an aspect, the operations comprise receiving a plurality signals broadcast at a plurality of frequencies. Each signal of the plurality of signals can be broadcast at a different frequency of the plurality of frequencies. In some aspects, the plurality of frequencies are in the range of 2.1 GHz and 86 GHz. Additionally, in some aspects the first signal is selected by filtering the plurality of signals based on a set of software defined radio rules, the filtered set of signals including the first signal and excluding a second signal. The second signal may be used to facilitate bidirectional communication from a network core (e.g., via a RAN) and the user equipment. The operations may quantifying the current transmitted to a second device as a measure of power and communicate that to a database for storage. The operations may further include transmitting the current to the second device includes the first device inducing a magnetic field or mechanically coupling the first device and the second device.

BRIEF DESCRIPTION OF THE DRAWINGS

Illustrative embodiments of the present invention are described in detail below with reference to the attached drawing figures, and wherein.

DETAILED DESCRIPTION

User equipment (UE), peripheral devices, and associated devices generally rely on alternating current (AC) or direct current (DC) input to charge or recharge their battery. Traditionally, the recharge process is manually regulated. In other words, a power source (e.g., the electrical grid, electricity scavenged from/generated by an internal combustion engine, or any similar source) provides power while a device is physically or magnetically coupled to the UE, peripheral devices, and associated devices. Similarly, external batteries transfer the stored charge to the UE, peripheral device, or associated device until the charge of the external battery is exhausted, the UE, peripheral device, or associated device is fully charged, or the external battery is uncoupled from the UE, peripheral device, or associated device. However, traditional systems may not provide an automatic system to harvest radio frequency (RF) spectrum and convert the energy into power to charge a battery of the UE, peripheral device, or associated device. Accordingly, embodiments of the systems, processes, devices, and methods described herein may provide for a power harvesting system that converts RF spectrum to a current. The current may be stored locally by a UE in a battery (e.g., recharge the UE's battery). Additionally, or alternatively, the current may be transferred to a peripheral device or associated device.

Figure 1A:
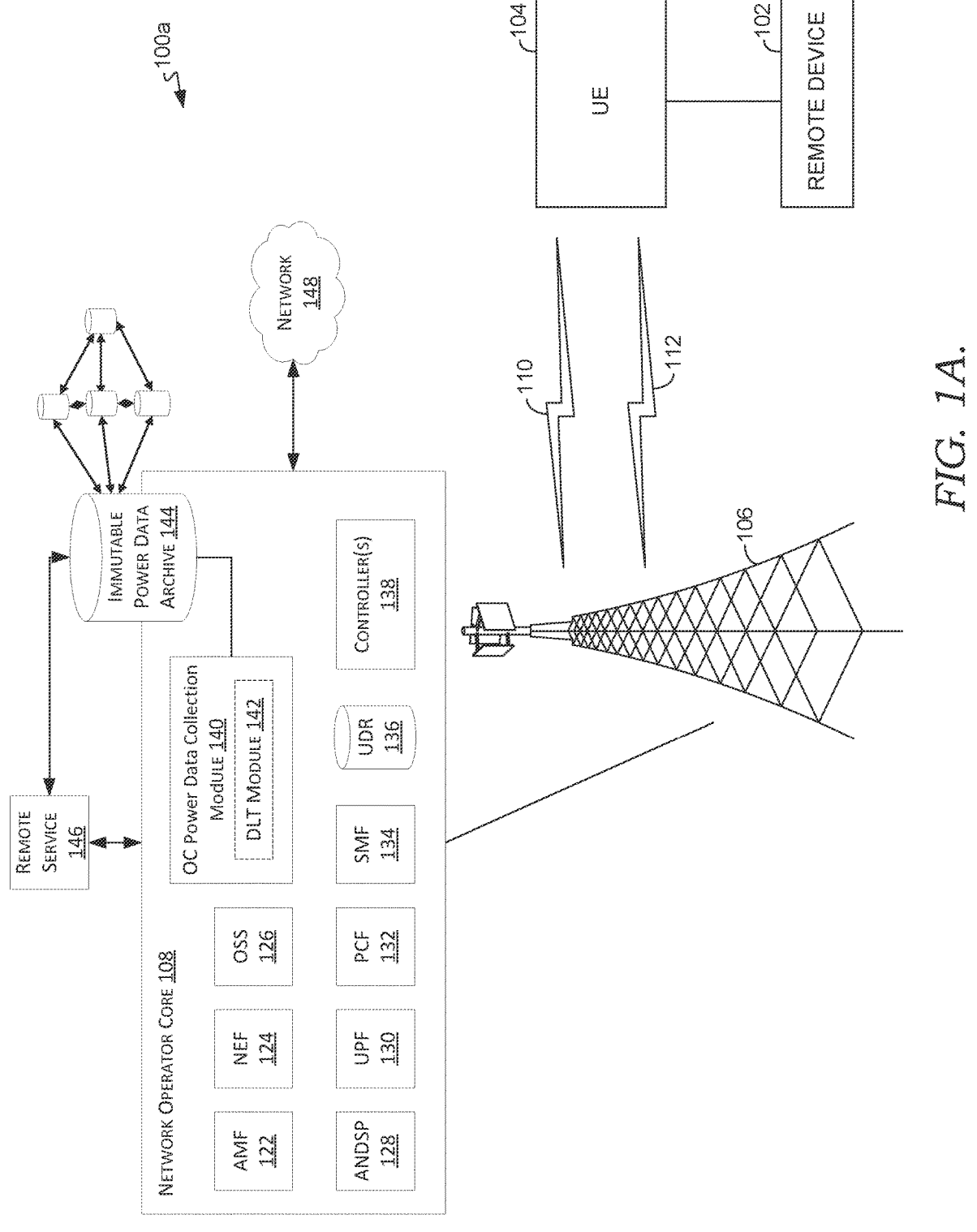
FIGS. 1A and 1B depict illustrative environments suitable for use in implementing aspects herein.
Figure 1B:
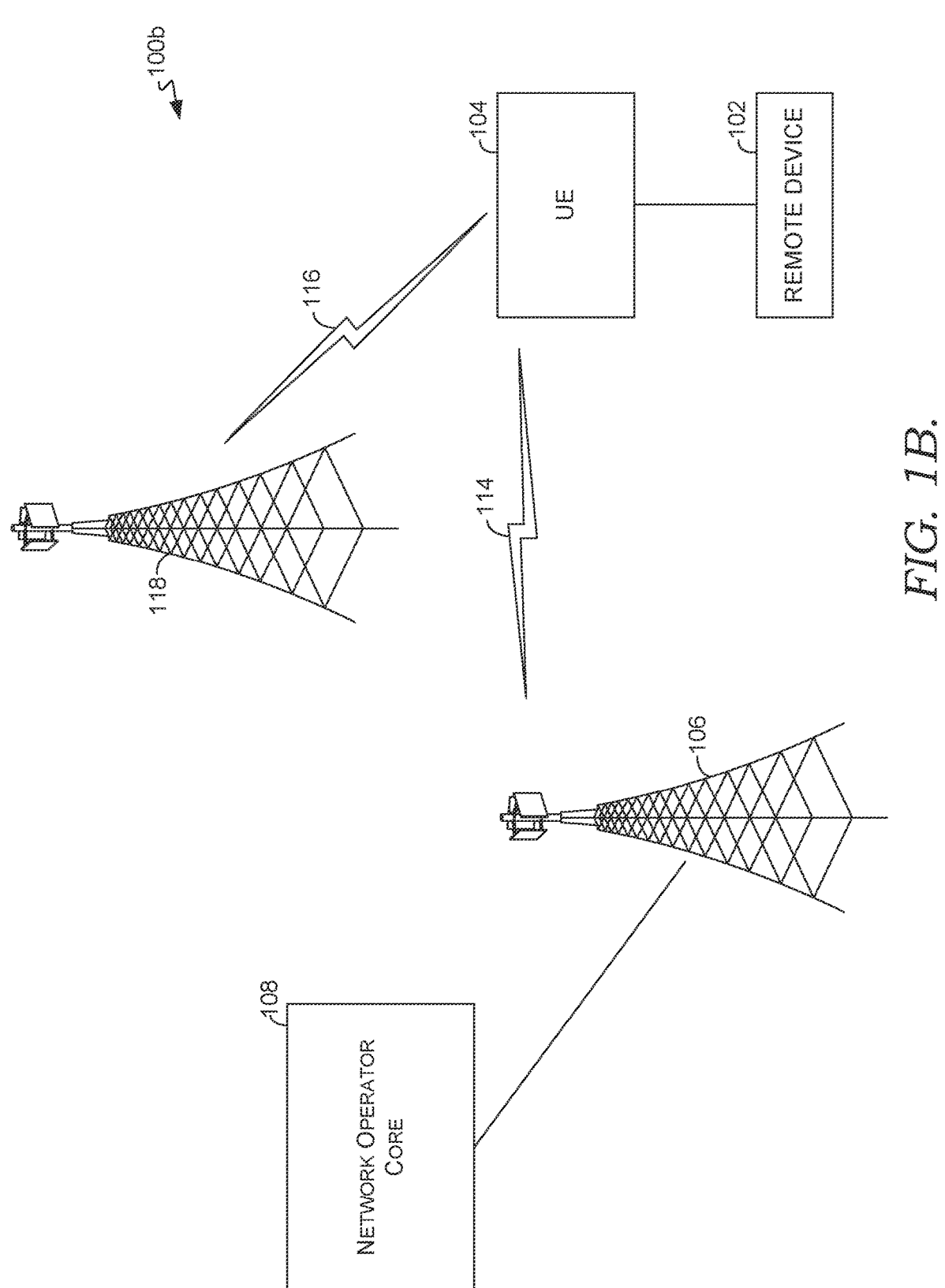

Turning generally to FIGS. 1A and 1B, example network environments 100a and 100b are depicted in accordance with embodiments described herein. Network environments 100a and 100b are but two examples of a suitable network environment and is not intended to suggest any limitation as to the scope of use or functionality of the embodiments disclosed herein. Neither should the network environment be interpreted as having any dependency or requirement relating to any one or combination of components illustrated. Network environments 100a and 100b generally include remote device 102, one or more UEs (e.g., UE 104), one or more radio access network (RAN) 106, and a network operator core (NOC) 108. Aspects of network 100 facilitate the bidirectional communication between UE 104 and NOC 108 via RAN 106. To facilitate this bidirectional communication network environment 100 may use RF signals broadcast by a RAN (e.g., RAN 106) and RF signals broadcast by UE 104. The RF signals may be in the range of 2.1 gigahertz (GHz) and 86 GHz.

With specific reference to FIG. 1A, network 100a includes remote device 102, UE 104, radio access network (RAN) 106, and a network operator core (NOC) 108. Remote device 102 can include one or more of the components described in relation to remote device 300 described in relation to FIG. 3. Remote device 102 generally includes any device that is configured to be couple-able with UE 104. For example, remote device 102 may be wireless headphone(s), an external UE battery, a wearable device, a different UE (i.e., a UE other than UE 104), or any other device with a rechargeable battery. The coupling can be via a wire-based connector or wireless coupling system.

Figure 2:
FIG. 2 depicts an example user equipment according to an aspect herein.
Figure 2:
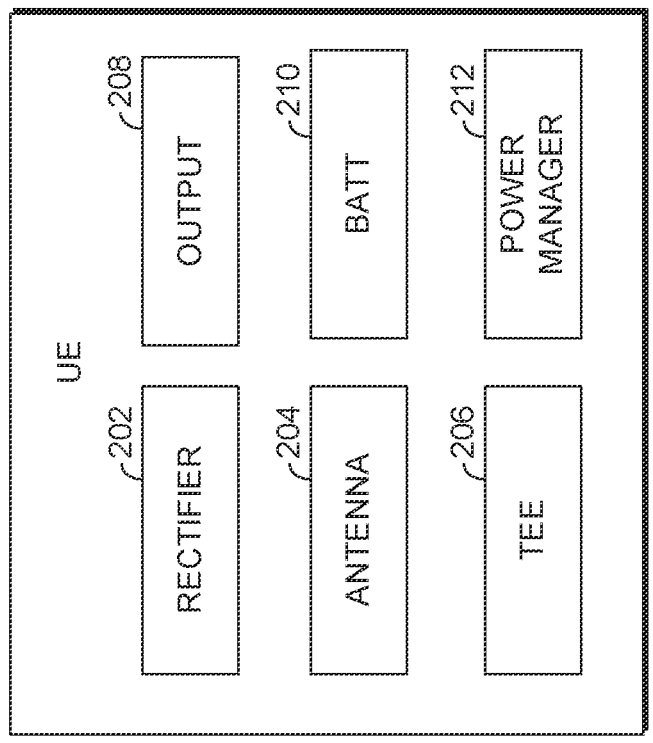

UE 104 can include one or more of the components described in relation to UE 200 described in relation to FIG. 2. Aspects of network 100 facilitate the bidirectional communication between UE 104 and NOC 108. To facilitate this bidirectional communication network 100 may use RF signals 110 broadcast by a RAN 106 and RF signals 112 broadcast by UE 104. In an embodiment, RF signals 110 and RF signals 112 are broadcast at the same frequency. In an embodiment, RF signals 110 and RF signals 112 are broadcast at different frequencies. In other words, the uplink (UL) RF and downlink (DL) RF may use the same frequency or may use different frequencies. Additionally, as depicted in FIG. 1A, RAN 106 broadcasts RF signals 116 that are received by UE 104. RF signals 116 may serve any number of purposes within network environment 100a. For example, RF signals 116 may be used to facilitate unidirectional or bidirectional communications with other UEs. For another example, RF signals 116 may facilitate network services that UE 104 is not currently utilizing. For another example RF signals 116 may be a signal deliberately broadcast by a RAN as a power harvesting service.

Additionally, or alternatively, the RAN broadcasting the RF signals 116 may be different than the RAN broadcasting RF signals 114. For example, as depicted in FIG. 1B RAN 118 broadcasts RF signals 116. RAN 118 may be similar to RAN 106. RAN 118 may be part of the same communication network (e.g., connected to the same network operator core 108 or a separate network core operated in parallel with network operator core 108) or may be part of a different communication network.

Returning to FIG. 1A, Network operator core 108 may include may comprise modules, also referred to as network functions (NFs), that include one or more of a core access and mobility management function (AMF) 122, an access network discovery and selection policy (ANDSP) 128, a user plane function (UPF) 130, a session management function (SMF) 134, a policy control function (PCF) 132, a network exposure function (NEF) 124, an operations support system (OSS) 126 and an operator core (OC) power data collection module 140. Implementation of these network functions may be executed by at least one controller 138 on which the network these one or more network functions are orchestrated or otherwise configured to execute utilizing processors and memory of the one or more controllers 138. Moreover, the network function may be implemented as physical or virtual network functions.

The AMF 122 facilitates mobility management, registration management, and connection management for 3GPP devices such as a UE 104. ANDSP 128 facilitates mobility management, registration management, and connection management for non-3GPP devices. SMF 134 facilitates initial creation of protocol data unit (PDU) sessions using session establishment procedures. The PCF 132 maintains and applies policy control decisions and subscription information. Additionally, in some aspects, the PCF 132 maintains quality of service (QoS) policy rules. For example, the QoS rules stored in a unified data repository can identify a set of access permissions, resource allocations, or any other QoS policy established by an operator.

Some aspects of network operator core 108 includes a unified data repository (UDR) 136 for storing information relating to access control. The UDR 136 is generally configured to store information relating to subscriber information and access and may be accessible by multiple different NFs in order to perform desirable functions. For example, the UDR 136 may be accessed by the AMF in order to determine subscriber information, accessed by a PCF 132 to obtain policy related data, accessed by a NEF 124 to obtain data that is permitted for exposure to third party applications. Such subscriber information may include whether a particular UE 104 has access or is eligible to utilize witness data collection services of the wireless network provider.

In addition to being accessible by one or more NFs, such as those described herein, the one or more NFs may also write information to the UDR 136. Similar to the AMF 122, the network environment 100 depicts the UDR 136 according to a version of the 3GPP 5G architecture; in other network architectures, it is expressly conceived that the UDR 136 may take any desirable form of a data repository capable of being written to and accessed by one or more NFs or other functions or modules (e.g., a call session control function). Though not illustrated so as to focus on the novel aspects of the present disclosure, the network environment may comprise a unified data management module (UDM) which may facilitate communication between an NF, function, or module and the UDR 136. Although depicted as a unified data management module, UDR 136 can be a plurality of network function (NF) specific data management modules.

The UPF 130 is generally configured to facilitate user plane operation relating to packet routing and forwarding, interconnection to a data network, policy enforcement, and data buffering, among others. In aspects where one or more portions of the network environment 100 are not structured according to the 3GPP 5G architecture, the UPF 130 may take other forms, such as a serving/packet gateway (S/PGW).

Notably, the preceding nomenclature is used with respect to the 3GPP 5G architecture; in other aspects, each of the preceding functions and/or modules may take different forms, including consolidated or distributed forms that perform the same general operations. For example, the AMF 122 in the 3GPP 5G architecture is configured for various functions relating to security and access management and authorization, including registration management, connection management, paging, and mobility management; in other forms, such as a 4G architecture, the AMF 122 of FIG. 1A may take the form of a mobility management entity (MME). The network operator core 108 may be generally said to authorize rights to and facilitate access to an application server/service such as remote service 146, requested by any of UE 104.

The OC power data collection module 140 generally facilitates the collection, recordation, and distribution of power harvesting and recharging data communicated to the network operator core 108 via UE 104. OC power data collection module 140 may collect sensor data actively or passively. For example, OC power data collection module 140 may monitor the stream of data communicated from UE 104 to the network operator core 108. The OC power data collection module 140 may extract sensor data from the data stream. For another example, sensor data may be routed to OC power data collection module 140 by one or more other NFs within the network operator core 108.

Some embodiments of OC power data collection module 140 includes a distributed leger technology (DLT) module 142. In such an embodiment, the DLT module 142 aggregates, arbitrates, and stores sensor data as immutable data in the immutable power data archive 144. The immutable power data archive 144 may comprise an element of a distributed ledger node network (DLN) comprising part of, or otherwise coupled to, the network operator core 108. Generally, DLN includes a plurality of nodes, each of which maintain an immutable ledger of data. A DLN node can use a cryptographic hash function (e.g., SHA256, MD5, Skein, BLAKE, or AES) to encode a fingerprint of the data stored in the DLN. In some aspects, the DLN node blocks a set of data including the cryptographic hash of the previously stored block, at least partially, to ensure that entries in the ledger cannot be retroactively changed without irreconcilably changing the hashes of subsequent entries in the ledger. For example, DLN can comprise a network of hashgraph nodes, blockchain nodes, or similar distributed ledger nodes. In a particular aspect, network environment 100*a* includes at least one hyperledger node. In some aspects, DLN is a private distributed ledger network. The DLN may include a consensus module that ensures the leger includes records that are verified by a minimum number of nodes, a majority of nodes, or a specifically identified node. The distributed ledger maintained by DLN can store sensor data or any other data. For example, the sensor data may be stored in the immutable power data archive 144 as a distinct distributed ledger entry in a distributed ledger (e.g., a block-chain, hashgraph, and so forth). The distributed ledger entry may include additional information in some embodiments. For example, the distributed ledger entry may include UE 104 location data (e.g., GPS coordinates), a time stamp, or any other contextually relevant data. Additionally, the OC power data collection module 140 may sign an entry with a private key or certificate of authority associated with the network operator core 108. Such an embedment, may sign an entry to provide assurance that the entries of the DLN are authentic.

Network 148 generally facilitates communication between the UE 104, remote service 146, a public switched telephone network (PSTN), and any other networked device. As such, network 148 can include access points, routers, switches, or other commonly understood network components that provide wired or wireless network connectivity. In other words, network 148 may include multiple networks, or a network of networks, but is depicted in a simple form so as not to obscure aspects of the present disclosure. By way of example, network 126 can include one or more wide area networks (WANs), one or more local area networks (LANs), one or more public networks, such as the Internet, one or more private networks, one or more telecommunications networks, or any combination thereof. Where network 148 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 148 is not described in significant detail herein.

Network environment 100 can include remote service 146. Remote service 146 generally facilitates hosting services, data, or both for an application monitoring power data. For example, a remote service can be application server hosting an inventory management system, outfacing services (e.g., banking, medical, social, and similar services), or storage service. The hosted website or data server can support any type of website or application, including those that facilitate logistics, gaming, media upload, download, streaming, distribution, or storage. Network environment 100 may further facilitate providing remote service 146 access to power data collected by network operator core 108. For example, as depicted in FIG. 1A, remote service 146 may access power data stored in immutable power data archive 144. In some embodiments, access to power data is provided directly via permissioned access to a node of a DLN maintaining a copy of immutable power data archive 144. Additionally, or alternatively, remote service 146 may access sensor data via communication with network operator core 108.

Turning to FIG. 2 and with passing reference to FIGS. 1A and 1B, an illustrative example of a UE 200 is depicted in accordance with aspects described herein. Generally, UE 200 is configured to receive and broadcast RF signals for bidirectional communication between UE 200 and a RAN. For example, UE 200 may be UE 104 in FIGS. 1A and 1B. Generally, UE 200 includes rectifier 202, antenna 204, battery 210, power manager 212, and output 208.

The rectifier 202 converts the induced alternating current into a direct current. To facilitate the conversion, rectifier 202 may be coupled to antenna 204. The coupling can comprise any technique suitable to allow the induced current to flow as input to the rectifier 202. For example, the rectifier 202 may be soldered, crimped, or otherwise coupled to the antenna 204. In some aspects, rectifier 202 may be indirectly coupled to antenna 204 via another component of UE 200. For example, the rectifier 202 may be coupled to antenna 204 via a radio. Generally, the rectifier may be single-phase or multi-phase depending on the network configuration. For example, in some embodiments the rectifier 202 is configured for half-wave rectification. In some embodiments the rectifier 202 is configured for full-wave rectification. The rectifier 202 may include input filters to smooth the output DC current. In some aspects, the rectifier 202 may be part of, or coupled to an ambient electromagnetic power harvesting (AEPH) chip that converts electromagnetic power to electrical current. Additionally, rectifier 202 may be coupled to power manager 212.

Antenna 204 may be one or more omnidirectional antennas or directional antennas. Similarly, antenna 204 may comprise monopole or dipole elements. In some embodiments, antenna 204 in intentionally optimized to receive and broadcast at a particular frequency or range of frequencies. For example, antenna 204 may be tuned to receive and broadcast in the range of 2.1 GHz and 86 GHz.

Output 208 provides coupling with a remote device (e.g., remote device 102 of FIGS. 1A and 1B). For example, output 208 may be an input/output port (e.g., input/output (I/O) ports 618 of FIG. 6) or a similar to I/O ports 618 in some aspects. The coupling may be facilitated by a wire-based connector. For example, the coupling may be facilitated by a universal serial bus (USB) type wire-based connector, a Thunderbolt®, or similar wire-based connector. Additionally, or alternatively, output 208 may include a wireless coupling system. For example, the coupling may be facilitated by electromagnetic induction coil. Amongst other things, output 208 is configured to transfer power from UE 200 to a remote device (e.g., remote device 102 of FIG. 1A).

Generally, battery 210 converts chemical energy into electrical energy to power, or at least partially power, UE 200. Battery 210 may be integrated with UE 200 or removable from UE 200 in some embodiments. As used in reference to the battery 210, a removable battery refers to a battery that, by design, can be connected with UE 200, disconnected, and replaced with another battery without compromising the integrity of the UE other than removing a portion of the UE's housing intentionally designed to allow access to the battery. An integrated battery refers to a battery that, by design, is not removable. Battery 210 may include any suitable combination of chemicals in one or more cells. In some embodiments, battery 210 is rechargeable (e.g., the chemical process that produces the electrical energy is intentionally reversible). For example, battery 210 may be a Lead-acid, Zinc-air, Lithium polymer (Li—Po), Nickel-Cadmium (NiCad), Nickel-Metal Hydride (NiMH), Lithium Ion (Li-ion) battery, or any other suitable combination.

Power manager 212 monitors and collects data related to the energy harvested by the UE 200 from RF signals. For example, the power manager 212 may collect data identifying the frequencies used by rectifier 202 to generate current, the amount of current generated, the voltage of the current generated, the amount of current transmitted to battery 210, the amount of current transferred to a remote device (e.g., remote device 102 of FIGS. 1A and 1B) via output 208, the voltage of the current transferred to the remote device, or any combination thereof. Additionally, power manager 212 includes executable code that calculates secondary data. For example, power manager 212 may calculate the power generated by rectifier 202, the efficiency of energy harvesting, the power transferred to a remote device, or any combination thereof. Power manager 212 stores this data in a computer readable format in a log locally maintained by UE 200.

Although some UE's may include other systems, generally UE 200 includes an application layer and a trusted execution environment (TEE) 206. The application layer facilitates UE 200 operating system, executables (including applications), and the user interface. In other words, the application layer provides the direct user interaction environment for the UE 200. TEE 206 facilitates a secure area of the processor(s) of UE 200. In other words, TEE 206 provides an environment in the UE 200 with isolated execution and confidentiality features. Example TEEs include TrustZone, SGX, or similar. Generally, computer readable code executed in the TEE 206 can securely access data stored memory of the UE 200 that is otherwise inaccessible in the application layer. For example, computer readable code (e.g., trustlet) executed in TEE 206 can access power data, private and/or public keys, location service data and similar data stored by the UE 200. Trustlets (e.g., trusted processes, secure processes, IUM processes, or the like) can be activated in response to various network or UE operations. For example, a trustlet can be activated by execution of an associated application in the application layer. For another example, a trustlet can be activated in response to a command generated by a network (e.g., network operator core 108 of FIG. 1A) and communicated to the UE. The trustlet(s) activated may vary depending on the service requested. For example, a trustlet may be activated in response to a power management data request. For another example, a trustlet may be activated in response to detection of the initiation of a connection to a remote device (e.g., remote device 102 of FIGS. 1A and 1B) via output 208.

Upon activation, a trustlet performs a set of predetermined operations. The operations may be executed once (i.e., upon activation), continuously, periodically, or intermittently. The operations can include, but are not limited to: accessing data stored by a UE's power management module (e.g., power manager 212); accessing data stored by the UE (such as a set of keys that are embedded directly into a processor or microcontroller during manufacturing, certificates of authority, unique device identifiers, captured power data, or any other data); control operations of the UE (such as activating a software defined radio, monitoring data received by the UE, activation of other UE systems, or other similar UE operations); access or monitor operations of the UE; access or monitor operations of other applications executed by the UE; writing data to the memory of UE; activate another trustlet; or any combination thereof.

TEE 206 includes a power management control trustlet. Power management control trustlet corresponds to an illustrative example of computer readable code that is activated in response to execution of an application or operation. Upon activation, power management control trustlet may perform one or more operations. For example, the power management control trustlet may analyze the captured RF signals using a software defined radio executed by UE 200. The software defined radio may include one or more filters configured to isolate a range of radio frequencies. The filters may be configured with exclusionary logic, inclusionary logic, or both. In an embodiment, the filters are programed to exclude the range of radio frequencies corresponding to those currently facilitating bidirectional communication between a RAN (e.g., RAN 106 of FIGS. 1A and 1B) and UE 200. Similarly, the filters can be programmed to exclude a range of radio frequencies that are facilitating communication between the UE 200 and any other device. For example, the radio frequencies facilitating a Bluetooth connection between UE 200 and a set of headphones may be excluded. In an embodiment, the filters are programed to isolate a range of radio frequencies based on the power of the received RF signals. Said another way, the filters may identify a range of radio frequencies received by the UE 200 above a predetermined threshold. The filters may further exclude the radio frequencies currently being used by the UE 200 to communicate with a RAN. The power management control trustlet can activate rectifier 202 to harvest energy from at least one of the radio frequencies, or range of frequencies, isolated by the filters.

Additionally, power management control trustlet may execute operations that cause the UE 200 to communicate a payload including power manager log data to a network core for storage. For example, power management control trustlet may encode the payload for transmission via the non-access data stratum communication channel to network operator core 108 of FIGS. 1A and 1B. In some embodiments, the payload may additionally include UE data. For example, the UE data may include location data (e.g., GPS or local Wi-Fi network data), RF data (e.g., the frequency of the harvested RF signals), a time stamp (e.g., the UE's device time, the network asserted time, or similar), a private key associated with the power management control trustlet, certificate of authority associated with the power management control trustlet, any other similar data, or any combination thereof.

Figure 6:
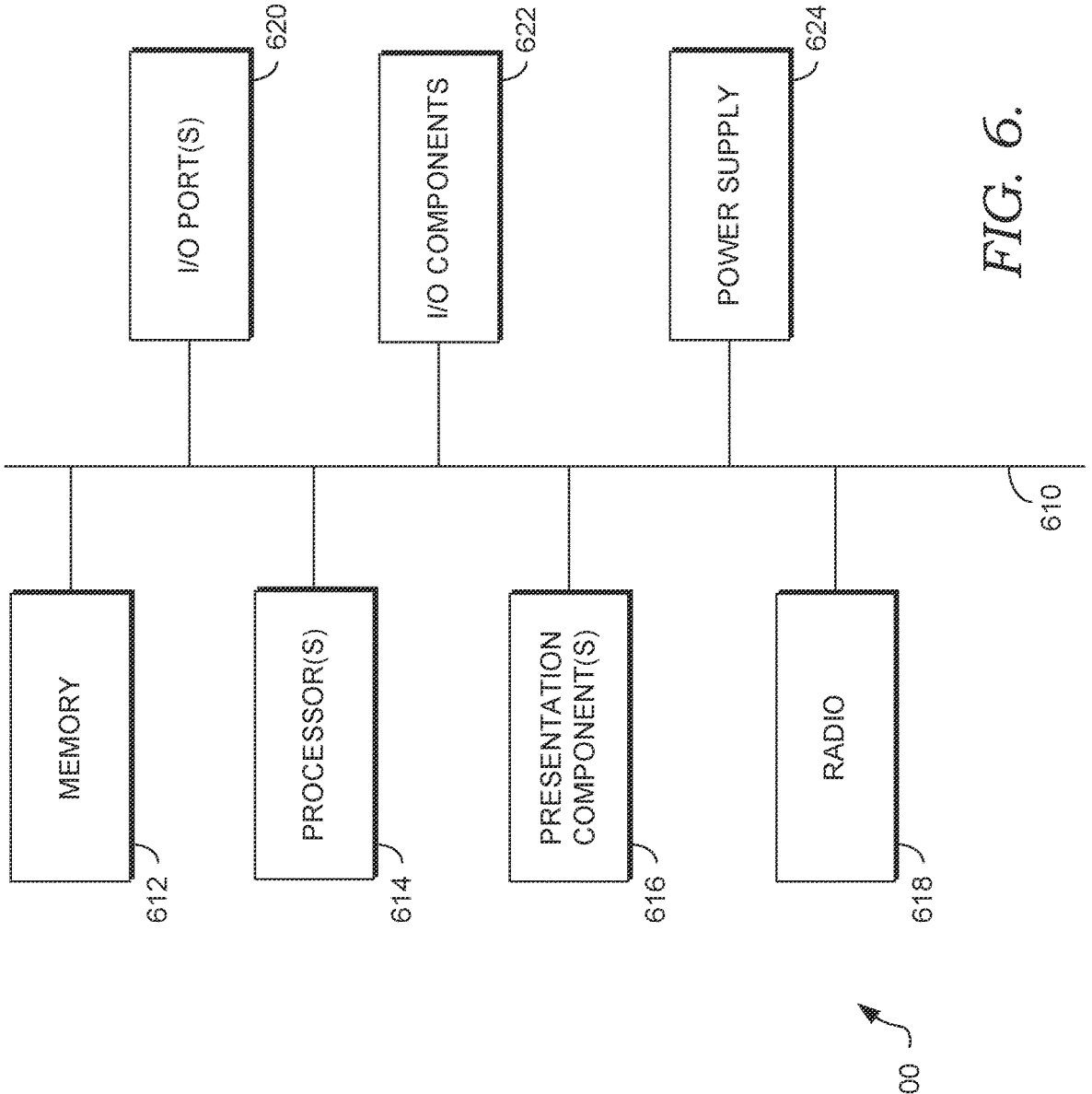
FIG. 6 depicts an exemplary computing device suitable for use in implementing aspects herein.

Some embodiments of UE 200 include one or more components of computing device 600 described in relation to FIG. 6. For example UE 200 can include a mobile device, a mobile broadband adapter, a fixed location or temporarily fixed location device, or any other communications device employed to communicate with RAN 106 of FIGS. 1A and 1B. For an illustrative example, a UE can include cell phones, smartphones, tablets, laptops, small cell network devices (such as micro cell, pico cell, femto cell, or similar devices), and so forth. As further discussed below, UE 200 may comprise components that include applications running on the processor(s) of the UE 200 and/or components that facilitate remote execution of applications running on one or more controllers or network functions (NFs), whether physical network functions or virtual network functions, making up the network operator core 108. Makers of UE devices include, for example, Research in Motion, Creative Technologies Corp., Samsung, Apple computers, Google, Nokia, Motorola, and the like. UE 200 can include, for example, a display(s), a power source(s) (e.g., battery 210), a data store(s), a speaker(s), memory, a buffer(s), and the like. It should be understood that the UE discussed herein are not limited to handheld personal computing devices such as cellular phones, tablets, and similar consumer equipment, but includes other forms of equipment and machines such as autonomous or semi-autonomous vehicles including cars, trucks, trains, aircraft, urban air mobility (UAM) vehicles, drones, robots, exoskeletons, manufacturing tooling, and other high science appliances, for example. Moreover, the UE need not be limited to mobile UE as other UE examples include stationary UE applications where witness data is desirable for establishing facts regarding events involving wireless connections. Examples of stationary UE applications include, but are not limited to, internet-of-things (IoT) devices, smart appliances, thermostats, locks, smart speakers, lighting devices, smart receptacles, controllers, mechanical actuators, remote sensors such as traffic sensors, weather or other environmental sensors, wireless beacons, and the like.

Figure 3:
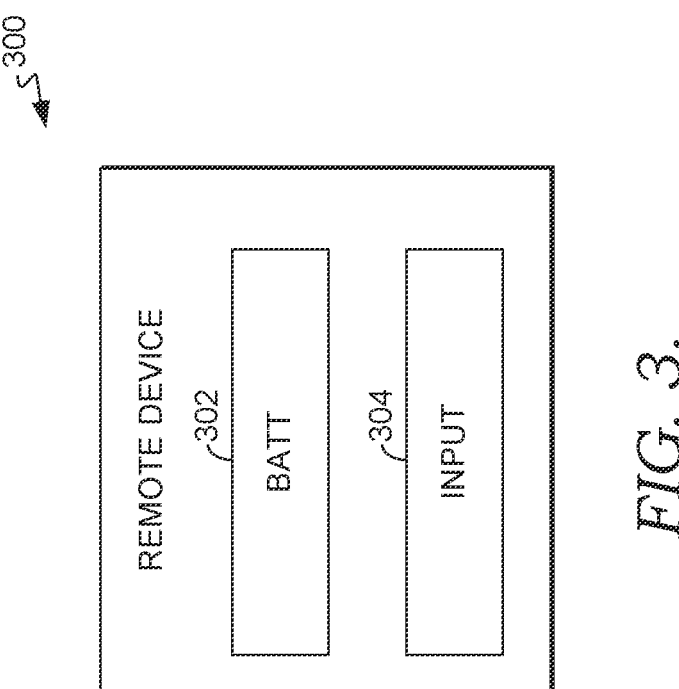
FIG. 3 depicts an example remote device according to an aspect herein.

Turning to FIG. 3, FIG. 3 depicts an example remote device 300 in accordance to aspects described herein. Generally, remote device 300 may be any device with a power source independent of UE 200 described in relation to FIG. 2. For example, remote device 300 be a wireless headphone(s), an external UE battery, a wearable device, a different UE (i.e., a UE other than UE 200), or any other device. Amongst other things, remote device 300 includes battery 302 and input 304.

Battery 302 stores chemical energy and converts it into electrical energy to power, or at least partially power, remote device 300. Battery 302 may be integrated with remote device 300 or removable from remote device 300 in some embodiments. As used in reference to the battery 302, a removable battery refers to a battery that, by design, can be connected with remote device 300, disconnected, and replaced with another battery without compromising the integrity of the remote device other than removing a portion of the remote device's housing intentionally designed to allow access to the battery. An integrated battery refers to a battery that, by design, is not removable. Battery 302 may include any suitable combination of chemicals in one or more cells. In some embodiments, battery 302 is rechargeable (e.g., the chemical process that produces the electrical energy is intentionally reversible). For example, battery 302 may be a Lead-acid, Zinc-air, Lithium polymer (Li—Po), Nickel-Cadmium (NiCad), Nickel-Metal Hydride (NiMH), Lithium Ion (Li-ion) battery, or any other suitable combination.

Input 304 provides coupling with, amongst other things, a UE (e.g., UE 200 of FIG. 2 or UE 104 of FIGS. 1A and 1B). For example, input 304 may be an input/output port (e.g., input/output (I/O) ports 618 of FIG. 6) or a similar to I/O ports 618 in some aspects. The coupling may be facilitated by a wire-based connector. For example, the coupling may be facilitated by a universal serial bus (USB) type wire-based connector, a Thunderbolt® connector, or similar wire-based connector. Additionally, or alternatively, input 304 may include a wireless coupling system. For example, the coupling may be facilitated by electromagnetic induction coil. Amongst other things, input 304 is configured to transfer power from a UE (e.g., UE 200 of FIG. 2) to the remote device 300.

Figure 4:
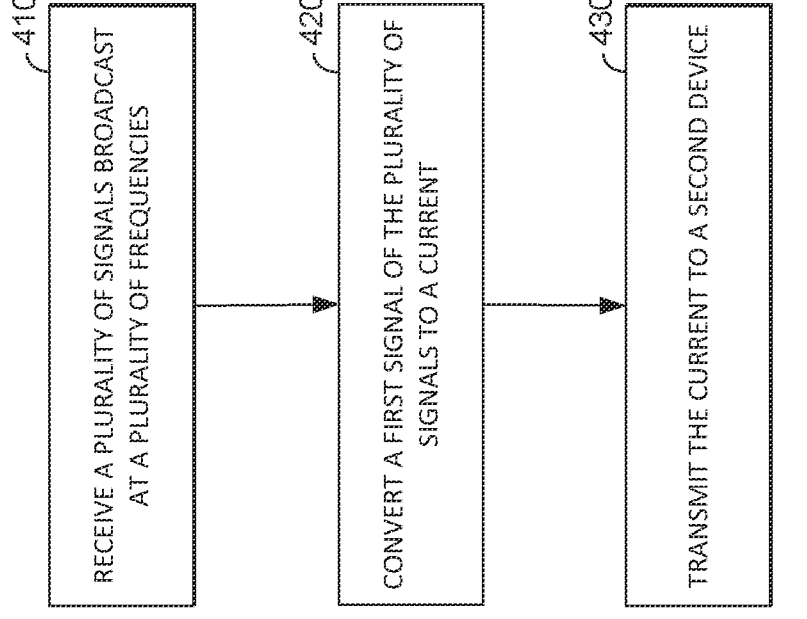
FIG. 4 depicts an example method for transferring power harvested from RF signals, according to aspects herein.
Figure 4:
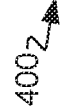

Turning to FIG. 4, a method 400 for transferring power harvested from RF signals to a remote secondary device is depicted, in accordance to aspects described herein. Some embodiments of method 400 may be facilitated by a UE (e.g., UE 200 of FIG. 2 and UE 104 of FIGS. 1A and 1B) that is configured to absorb RF signals. Additionally, method 400 may be facilitated by a secondary remote device (e.g., remote device 300 of FIG. 3 and remote device 102 of FIGS. 1A and 1B). Some embodiments of method 400 include additional steps not specifically depicted with FIG. 4. For example, method 400 may include one or more steps of method 500 described in relation to FIG. 5. Some embodiments of method 400 being with step 410.

Method 400 includes, at step 410, receiving, by a first device, a plurality of signals broadcast at a plurality of frequencies. In some embodiments, a UE receives the plurality of RF signals. In some embodiments, each signal of the plurality of signals is broadcast at a different frequency of the plurality of frequencies. For example, a RAN (e.g., RAN 106 of FIG. 1A or RAN 118 of FIG. 1B) may broadcast RF signals with a plurality of frequencies. One or more of the RF signals may initiate, or be part of an existing, bidirectional communication channel between a UE and a RAN. The received plurality of frequencies are analyzed to identify one or more frequencies to convert to electrical current in some aspects of method 400. For example, a trustlet executed in a TEE (e.g., TEE 206 of FIG. 2) or application executed in an application layer may filter the plurality of RF signals to isolate a frequency, set of frequencies, or range of frequencies to convert to electrical current.

Method 400 includes, at step 420, converting a signal of the plurality of signal to a current. Some embodiments of step 420 may be facilitated by one or more components of a UE described in reference to FIGS. 1A, 1B, and 2. For example, the antenna 204 may absorb the RF signals broadcast by the RAN. A software defined radio may pass RF signals of a frequency, set of frequencies, or range of frequencies to a rectifier (e.g., rectifier 202 of FIG. 2).

Method 400 includes, at step 430, transmitting the current to a second device. Some embodiments of step 430 may be facilitated by an output of a UE (e.g., output 208 of FIG. 2) and an input of a remote device (e.g., input 304 of FIG. 3). Some embodiments of method 400 includes monitoring the transfer of electrical current from the UE to the remote secondary device. For example, a power manager (e.g., power manager 212 of FIG. 2) may record data regarding the transfer of electrical current from the UE to the remote secondary device.

Figure 5:
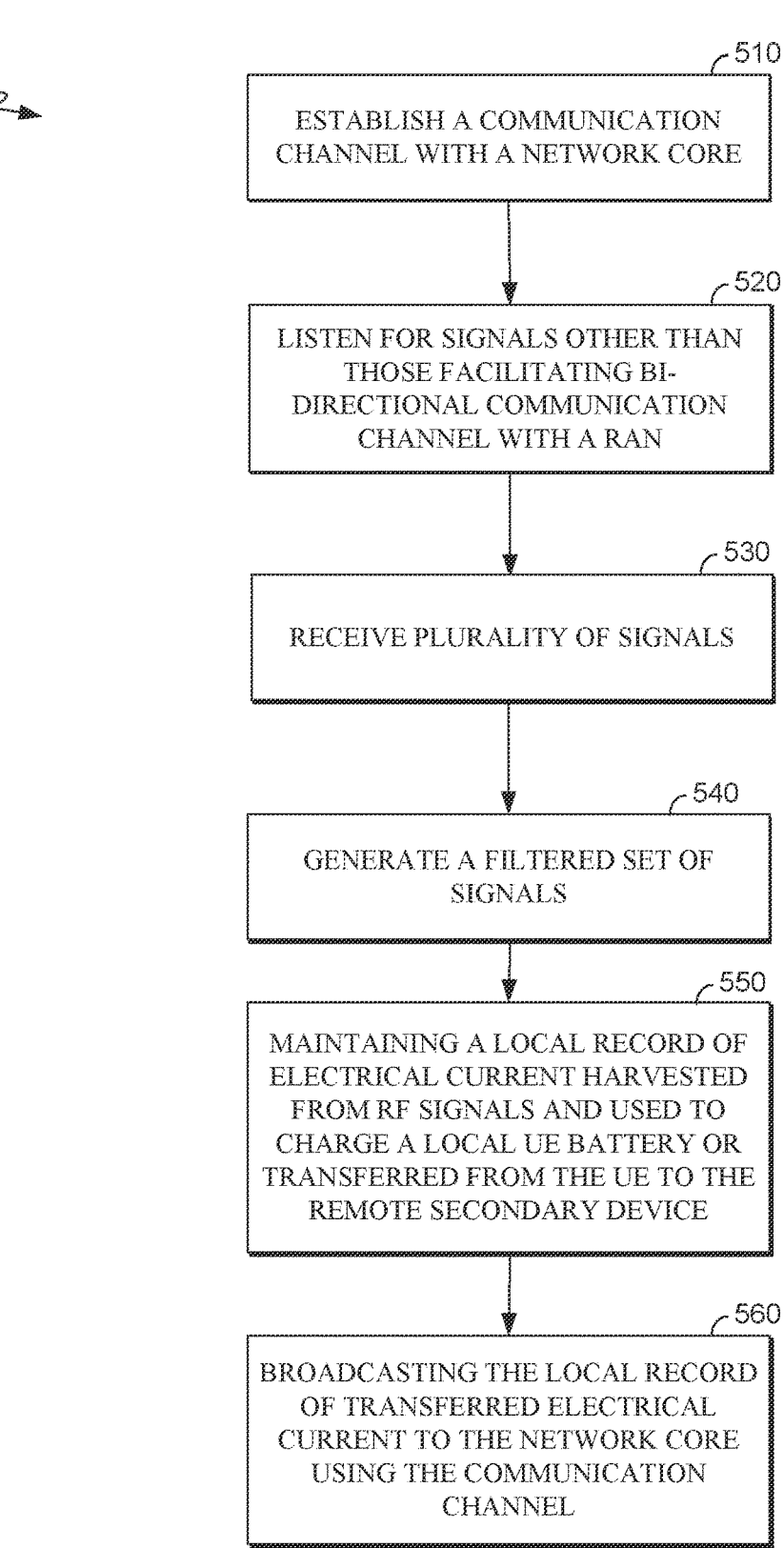
FIG. 5 depicts an example method for communicating power data harvested from RF signals, according to an aspect herein.

Turning to FIG. 5, a method 500 for communicating data related to RF signal harvesting is depicted, in accordance to aspects described herein. Some embodiments of method 500 may be facilitated by a UE (e.g., UE 200 of FIG. 2 and UE 104 of FIGS. 1A and 1B) that is configured to receive and broadcast RF signals.

At step 510, a communication channel is established with a network core. In some embodiments, the communication channel is facilitated by bidirectional broadcasts of RF signals with a RAN (e.g., RAN 106 of FIG. 1A). The communication channel may include a non-access stratum (NAS) that is used to manage the session between the UE and the network core (e.g., network operator core 108 of FIG. 1A).

Method 500 includes, at step 520, listening for signals other than those facilitating the bidirectional communication channel with a RAN. Some embodiments of step 520 are facilitated by one or more components of a UE. For example, a trustlet may monitor and capture RF signals received by an antenna of the UE. At step 530, a plurality of signals are received. The plurality of signal may be received by the antenna of the UE while a trustlet is monitoring RF sign.

Method 500 includes, at step 540, generating a filtered set of signals. The filtered set of signals may be generated by filtering the plurality of signals received at step 530. Some embodiments of step 540, are facilitated by one or more components of a UE. For example, a power management control trustlet may analyze the captured RF signals using a software defined transceiver and a set of software defined transceiver rules. The software defined transceiver rules may include one or more filters tuned to isolate a range of radio frequencies. In an embodiment, the filters are configured to exclude the radio frequencies associated with the bidirectional communication established in step 510 from the range of radio frequencies that are isolated. In other words, the range of radio frequencies isolated by the filters does not include more or more radio frequencies that are used by a RAN to intentionally communicate data to the UE in some aspects.

Method 500 includes, at step 550, maintaining a local record of electrical current harvested from RF signals and used to charge a local UE battery or transferred from the UE to the remote secondary device. The electrical current may be generated by a rectifier circuit (e.g., rectifier 202 of FIG. 2) of a UE from the range of radio frequencies isolated at step 540. The local record may identify the range of radio frequencies isolated, each radio frequency isolated, or both in some aspects. The local record may additionally include data that quantifies the electrical current transferred to the remote device. The local record may include additional data that identifies the input of the UE used to facilitate the transfer.

Method 500 includes, at step 560, broadcasting the local record of transferred electrical current to the network core using the communication channel. The broadcast includes the local record of electrical current of step 550 and additional data in some embodiments. For example, a power management control trustlet may encode a payload for transmission via the communication channel established in step 510. The payload may include UE data associated with the UE executing the power management control trustlet. For example, the UE data may include location data (e.g., GPS or local Wi-Fi network data), RF data (e.g., the frequency of the RF signal), a time stamp (e.g., the UE's device time, the network asserted time), a private key associated with the power management control tracking trustlet, certificate of authority associated with the power management control trustlet, any other similar data, or any combination thereof. As can be appreciated in view of the description provided herein, supplementing the payload with additional UE data can provide enhanced power harvesting tracking. For example, including the location data may facilitate reallocating RF resources at a particular RAN. For another example, including a private key or certificate of authority may facilitate authentication of the payload.

Some embodiments of method 500 further includes storing data associated with the filtered set of signals in a distributed ledger maintained by a node of a multi-node network. The data may be written to a ledger using a private key corresponding to a component of a network operator core.

Turning to FIG. 6, computing device 600 includes bus 610 that directly or indirectly couples the following devices: memory 612, one or more processors 614, one or more presentation components 616, input/output (I/O) ports 618, I/O components 620, and power supply 622. Bus 610 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 620. Also, processors, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. Memory 612 may be removable, nonremovable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, camera, joystick, game pad, satellite dish, scanner, printer, wireless device, etc.

Radio 624 represents a radio that facilitates communication with a wireless telecommunications network. In aspects, the radio 624 utilizes one or more transmitters, receivers, and antennas to communicate with the wireless telecommunications network on a first downlink/uplink channel. Though only one radio is depicted in FIG. 6, it is expressly conceived that the computing device 600 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 624 might additionally or alternatively facilitate other types of wireless communications including Wi-Fi, WiMAX, LTE, or other VoIP communications. As can be appreciated, in various embodiments, radio 624 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The subject matter of the technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Throughout the description provided herein several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018).

As used herein, the terms "function", "unit", "node" and "module" are used to describe a computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method comprising:
receiving, by a first device, a plurality signals broadcast at a plurality of frequencies, each signal of the plurality of signals broadcast at a different frequency of the plurality of frequencies;
converting a first signal of the plurality of signals to a current;
selecting the first signal by filtering the plurality of signals based on a set of software defined radio rules, the filtered set of signals including the first signal and excluding a second signal;
establishing a communication channel with a network core via a base station, the communication channel utilizing a second signal of the plurality of signals as a downlink; and
transmitting the current to a second device.

2. The method of claim 1, wherein the plurality of frequencies are in the range of 2.1 GHz and 86 GHz.

3. The method of claim 1, wherein transmitting the current to the second device includes inducing, by the first device, a magnetic field.

4. The method of claim 1, wherein transmitting the current to the second device includes transmitting the current through an interface, at least temporarily, mechanically coupling the first device with the second device.

5. The method of claim 1, further comprising:
quantifying the current transmitted to a second device as a measure of power;
communicating the measure of power to a database for storage.

6. The method of claim 5, wherein the database is maintained by a node of a node network.

7. A system comprising:

an user device including at least one antenna communicatively coupled to a rectifier circuit;

computer readable memory storing instructions that when executed by the user device cause the user device to perform operations including:

receiving, via the at least one antenna, a plurality signals broadcast at a plurality of frequencies, each signal of the plurality of signals broadcast at a different frequency of the plurality of frequencies;

converting, via the rectifier, a first signal of the plurality of signals to a current;

selecting the first signal by filtering the plurality of signals based on a set of software defined transceiver rules, the filtered set of signals including the first signal and excluding the second signal;

establishing a communication channel with a network core via a base station, the communication channel utilizing a second signal of the plurality of signals as a downlink; and transmitting the current to a remote device.

8. The system of claim 7, wherein the plurality of frequencies are in the range of 2.1 GHz and 86 GHz.

9. The system of claim 7, wherein transmitting the current to the second device includes inducing, by the first device, a magnetic field.

10. The system of claim 7, wherein transmitting the current to the second device includes transmitting the current through an interface, at least temporarily, mechanically coupling the first device with the second device.

11. The system of claim 7, further comprising:

quantifying the current transmitted to a second device as a measure of power;

communicating the measure of power to a database for storage.

12. A computerized method comprising:

receiving, by a first device, a plurality signals broadcast at a plurality of frequencies, each signal of the plurality of signals broadcast at a different frequency of the plurality of frequencies;

converting a first signal of the plurality of signals to a current;

selecting the first signal by filtering the plurality of signals based on a set of software defined transceiver rules, the filtered set of signals including the first signal and excluding the second signal;

establishing a communication channel with a network core via a base station, the communication channel utilizing a second signal of the plurality of signals as a downlink; and transmitting the current to a second device.

13. The method of claim 12, wherein the plurality of frequencies are in the range of 2.1 GHz and 86 GHz.

14. The method of claim 12, wherein transmitting the current to the second device includes inducing, by the first device, a magnetic field.

15. The method of claim 12, wherein transmitting the current to the second device includes transmitting the current through an interface, at least temporarily, mechanically coupling the first device with the second device.

* * * * *